Jan. 1, 1946.  M. VLOCK  2,392,109
X-RAY FILM PACKET HOLDER AND ANGLE INDICATOR
Filed April 26, 1943
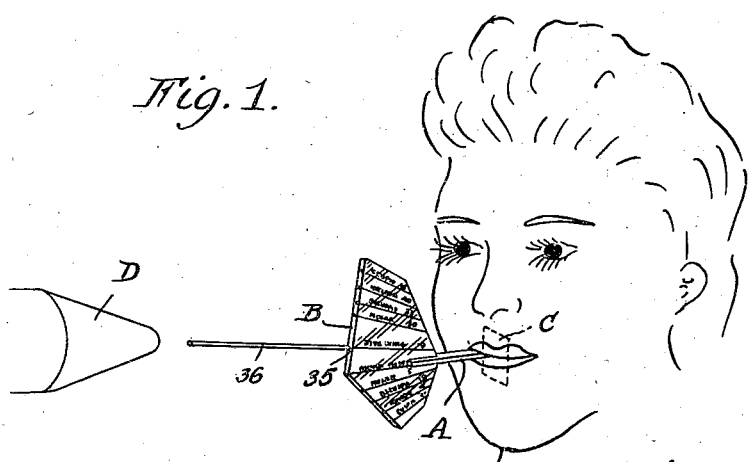
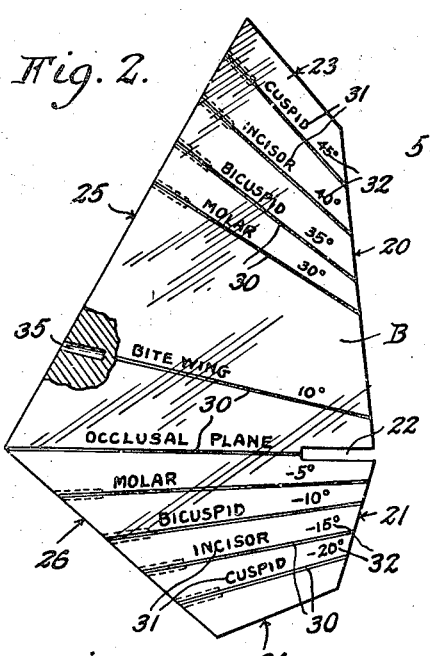
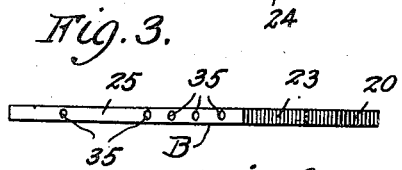
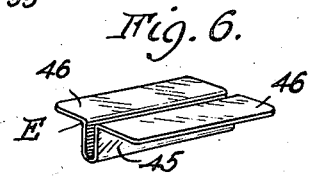
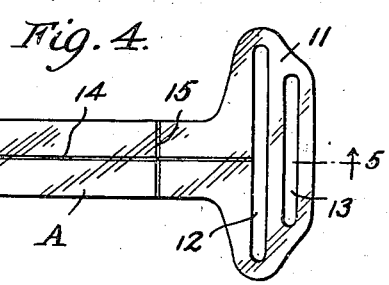
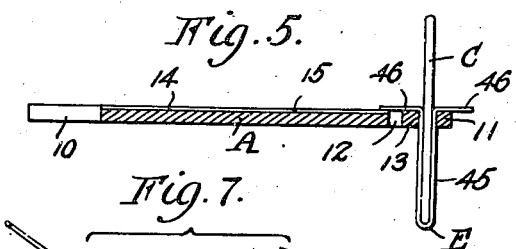
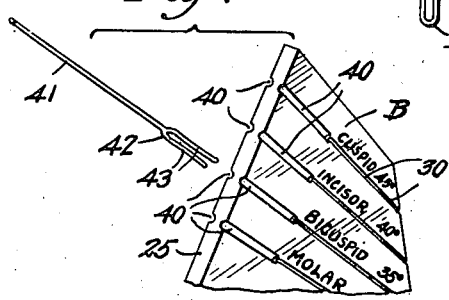
INVENTOR.
Mark Vlock
BY
Clark + Ott
ATTORNEYS Patented Jan. 1, 1946

2,392,109

UNITED STATES PATENT OFFICE 2,392,109

X-RAY FILM PACKET HOLDER AND ANGLE INDICATOR

Mark Vlock, New York, N. Y.

Application April 26, 1943, Serial No. 484,508

3 Claims. (Cl. 250—64)

This invention is for a device for supporting an X-ray film packet in juxtaposition to the tooth or teeth to be X-rayed and for indicating and gaging the proper angle at which the X-ray tube should be set for obtaining the exposure of the desired area on the film The invention broadly comprehends a device of the character set forth and for the purpose specified, by means of which a dentist may obtain the positioning and retention of the X-ray film packet in proper fixed relation to the tooth or teeth to be X-rayed and may more accurately gage the setting of the X-ray tube with reference to the film packet thus positioned so as to insure the exposure of the desired area.

More specifically, the invention resides in the provision of a device of the indicated character which includes a shank adapted to be gripped between the teeth of a patient and having means for supporting an X-ray film packet in juxtaposition to the tooth or teeth to be X-rayed together with an indicator plate carried by the shank exteriorly of the mouth and which plate bears indicia for respectively indicating and gaging the various angles at which the X-ray tube should be set for exposing various teeth.

As a further feature, the invention contemplates an X-ray film packet holder an angle indicator in which the shank and plate are preferable made up as separate sections or parts having detachable means of connection whereby the same may be separated when not in use so as to occupy a minimum amount of space for storage or shipment and whereby the parts may be separately replaced if damaged or broken.

The invention also embodies means formed on the shank and means detachably associated therewith for supporting the X-ray film packets in various positions with reference to the shank so as to dispose the film in juxtaposition to either the upper or lower teeth respectively for interproximal or apical examinations thereof.

As a still further feature, the invention provides means formed on the indicator plate and means detachably associated therewith for delineating a linear extension in prolongation of and protruding from the angle indicating indicia inscribed on the indicator plate by means of which the dentist may more accurately gage the setting of the axis of the X-ray tube with reference to the film for exposing the desired area.

With the above enumerated and other objects in view, the invention is set forth in greater detail in the following specification, particularly pointed out in the appended claims and illustrated in the accompanying drawing, in which:

Fig. 1 is a perspective view of a film holder and angle indicator on a reduced scale in applied position for use.

Fig. 2 is a side view of the indicator plate with shank detached therefrom.

Fig. 3 is a top edge view of the indicator plate.

Fig. 4 is a plan view of the shank member.

Fig. 5 is a longitudinal sectional view through the shank, taken on the line 5—5 of Fig. 4, showing a film packet associated therewith and supported by a locating clip with the film in an upright position for interproximal examination of the teeth.

Fig. 6 is a perspective view of a locating clip of different size employed for locating the film for the purpose making apical examinations of the teeth.

Fig. 7 is a fragmentary collective perspective view of a modified form of means for defining a linear extension of the angle indicating indicia.

Referring to the drawing by characters of reference, the X-ray film packet holder and angle indicator includes a shank member and an indicator plate which are designated generally by the reference characters A and B and which members are constructed of glass, rubber, wood, "lucite" or any other suitable material which permits of the free or unimpeded passage of the X-rays therethrough. As shown the members A and B are made up as separate elements or parts which are detachably associated with each other, although it is to be understood that they may be formed integral or permanently secured together without departing from the spirit or scope of the invention.

The shank member A is fashioned from a flat piece of stock and is of generally T-shaped form provided at its outer end portion with a vertically disposed longitudinally extending transversely medial notch 10 opening through the outer end edge thereof. The opposite end portion defines a head 11 perpendicular to the remainder of the shank and said head is formed with a pair of spaced parallel slots 12 and 13 extending longitudinally of the head and opening through the upper and lower surfaces thereof. Each slot is slightly wider than the thickness of a standard X-ray film packet and the slot 12 is of a length which corresponds substantially with the length of the film packets while the slot 13 is of a length which substantially coincides with the width of the film packets. The shank A is also provided with a longitudinally disposed transversely medial scribe line 14 which extends from the inner end of the notch 10 to the slot 12 and said shank is further provided with a transversely disposed scribe line 15 parallel to the slots 12 and 13 and spaced therefrom a sufficient distance to be exposed to view when the inner end of the shank is positioned in the patient's mouth.

The indicator plate B is also fashioned from a flat piece of stock of a thickness corresponding to the thickness of the stock from which the shank A is formed and, as shown, said plate is preferably defined by upper and lower rear edges 20 and 21, the former extending upwardly from the latter and being slightly inclined forwardly and the latter lower edge 21 extending downwardly from the edge 20 and provided with a slightly forward pitch. The indicator plate B, at the juncture of the rear edges 20 and 21, is formed with a notch 22 opening through the rear of the plate, extending forwardly thereof and of such a width as to snugly receive the forward end portion of the shank A immediately in rear of the notch 10 thereof, it being understood that the notched forward end portion of the shank likewise snugly interfits with the plate B immediately in advance of the notched portion of the same. This serves to detachably associate the shank A and the indicator plate B with the shank disposed, when in use, in a substantially horizontal plane perpendicular to the plate which will be disposed approximately in a vertical plane. The plate B also includes top and bottom edges 23 and 24, the former extending upwardly at a lesser inclination than the upper rear edge 20 and forwardly from its juncture therewith, while the latter bottom edge 24 extends forwardly at a lesser downward inclination from its juncture with the lower rear edge 21. The indicator plate is further defined by upper and lower forward edges 25 and 26 which are inclined rearwardly and respectively extend upwardly and downwardly from their juncture with each other to their juncture with the top and bottom edges 23 and 24.

One of the side faces of the indicator plate is suitably inscribed with indicia consisting of scribe lines 30 with associated wording 31 and numerical symbols 32, the scribe lines being disposed at relatively different angles with reference to each other and radiating from a substantially common focal point located approximately at the center of the slots 12 and 13 of the shank A, when the indicator plate is associated therewith in the manner previously set forth.

In the form of the indicator plate disposed in Figs. 1, 2 and 3, the forward edges 25 and 26 are formed with sockets or bores 35 opening through said edges and extending rearwardly therefrom in parallel relation to the scribe lines 30. These sockets or bores 35 are adapted to receive a pointer rod or stick 36 of wood, plastic or any equivalent radio-lucent material and which pointer rod or stick serves as a means for defining a linear extension in prolongation of and protruding from any one of the scribe lines 30, by means of which the dentist may more accurately gage the setting of the axis of the X-ray tube D with reference to the film packet C for exposing the desired area to the X-rays.

Variation of the pointer rod or stick and its manner of association with the indicator plate is shown in Fig. 7, wherein the indicator plate B is formed with grooves 40 on the opposite side faces thereof, opening through the forward edge 25 and parallel and in alignment with the scribe lines 30. In this instance the pointer rod or stick 41 is formed with a forked rear end 42 providing a pair of spring tines 43 adapted to straddle the indicator plate and respectively engage with the grooves 40 on the opposite side faces thereof.

In order to provide means for selectively supporting the film packet C in any one of a number of predetermined locations within the slots 12 and 13 of the head 11 of the shank, locating clips E of varying sizes are employed. The clips are also constructed of a radio-lucent material and are formed to provide a substantially U-shaped body 45 having oppositely disposed flanges 46, at the free ends of the body leads. The locating clips E are formed with U-shaped bodies 45 of different lengths to fit either of the slots 12 or 13 and said clip bodies vary in depth to dispose the film packet C at different vertical locations with reference to the shank head, depending upon whether the X-ray is for interproximal or apical examinations, the greater depth of the body, as in Fig. 5 being employed for interproximal examinations and the lesser depth of clip body, as shown in Fig. 6, being utilized for apical examinations.

In use, after the shank A and plate B have been assembled, the film packet C is positioned in either of the slots 12 or 13 in the desired position by utilizing the locating clip E in the manner specified, the inner headed end 11 of the shank A with the film packet C in associated relation therewith is then inserted in the patient's mouth so that the film is disposed directly in rear of the tooth or teeth to be X-rayed. By means of the scribe lines 14 and 15 the dentist may gage the proper position of the film with reference to the area to be X-rayed, as the line 15 is parallel to the plane of the film and the line 14 perpendicular thereto. By observing the scribe lines 30, the wording 31 and numerical symbols 32, the dentist is able to accurately gage the setting of the axial center of the X-ray tube D, the pointer rods or sticks 36 or 41 being utilized to extend the delineation of the scribe line 30 to a point adjacent the forward end of the X-ray tube, thereby further assisting in obtaining accuracy of the area to be exposed. After exposure, the shank A together with the film packet is removed from the mouth and the shank may be readily sterilized for subsequent use.

What is claimed is:

1. An X-ray film packet holder and X-ray tube indicator including a shank having means at one end thereof for receiving and retaining a film packet in vertically disposed position, an indicator plate carried by the shank at the opposite end thereof and having a surface disposed in a vertical plane, said plate having gage lines on said vertical surface disposed at relatively different angles and radiating from a common point approximately at the center of said film receiving and retaining means and said plate having sockets opening through the forward edge thereof parallel to the gage lines respectively and a detachable linear element selectively fitted in any one of said sockets for defining a linear extension in prolongation of the gage lines and protruding forwardly from the plate.

2. An X-ray film packet holder and X-ray tube indicator including a shank having means at one end thereof for receiving and retaining a film packet in vertically disposed position, an indicator plate carried by the shank at the opposite end thereof and having a surface disposed in a vertical plane, said plate having gage lines on said vertical surface disposed at relatively different angles and radiating from a common point approximately at the center of said film receiving and retaining means and said plate having grooves formed in opposite sides thereof parallel to the gage lines and a linear element having a resilient forked terminal selectively engaging in each pair of grooves to provide a linear extension in prolongation of the gage lines.

3. An X-ray film packet holder and X-ray tube angle indicator including a substantially T-shaped member providing a shank having a transverse head at one end thereof formed with a longitudinally disposed slot extending perpendicularly to the length of the shank, a detachable film position means located in said slot for disposing the film behind a tooth when the shank is gripped behind the teeth and means carried by the opposite end of the shank having indicia thereon for gaging the setting of the X-ray tube with reference to the film packet and the tooth area to be X-rayed.

MARK VLOCK.